United States Patent [19]
Walker

[11] Patent Number: 5,409,541
[45] Date of Patent: Apr. 25, 1995

[54] METHOD AND APPARATUS FOR EXTRACTING SOLUBLE AND DISPERSIBLE MATERIALS FROM PRODUCTS USING A SLOTTED SCROLL EXTRACTOR

[75] Inventor: David R. Walker, Clearwater, Fla.

[73] Assignee: dxResources Corporation, Tampa, Fla.

[21] Appl. No.: 159,833

[22] Filed: Nov. 30, 1993

[51] Int. Cl.[6] .................... B02C 23/08; C13D 3/14
[52] U.S. Cl. .................................. 127/2; 127/43; 127/44; 127/45; 426/616; 426/425; 241/24; 241/29; 241/260.1; 241/82.3
[58] Field of Search ............. 127/2, 43, 44, 45; 426/616, 425; 241/24, 29, 260.1, 82.3

[56] References Cited

U.S. PATENT DOCUMENTS

| | | |
|---|---|---|
| 623,892 | 4/1899 | Fairley ............................... 422/273 |
| 962,597 | 6/1910 | Stewart .............................. 127/45 |
| 1,283,099 | 10/1918 | Darling ............................. 422/273 |
| 1,766,033 | 6/1930 | Meakin ............................. 422/273 |
| 2,151,710 | 3/1939 | Mills ................................. 422/273 |
| 2,547,577 | 4/1951 | Hamacher et al. ................ 422/267 |
| 2,548,895 | 4/1951 | Graham et al. .................... 422/273 |
| 2,617,273 | 11/1952 | Findlay ............................. 422/251 |
| 2,857,907 | 10/1958 | Kaether et al. .................... 127/45 |
| 3,253,892 | 5/1966 | Brignac et al. .................... 422/137 |
| 3,471,218 | 10/1969 | Bruniche-Olsen ................. 422/273 |
| 3,573,982 | 4/1971 | Silver ................................ 422/273 |
| 3,644,103 | 2/1972 | Yoon ................................. 422/273 |
| 3,804,670 | 4/1974 | Farmer .............................. 422/273 |
| 4,363,264 | 12/1982 | Lang et al. ........................ 99/510 |
| 4,611,612 | 9/1986 | Obie et al. ........................ 134/65 |
| 4,873,095 | 10/1989 | Rundle ............................. 426/51 |
| 4,902,518 | 2/1990 | Lang et al. ........................ 426/15 |
| 5,275,834 | 1/1994 | Thibault et al. ................... 426/577 |

OTHER PUBLICATIONS

Tim Lange, *The Role of Research and Development in Food Liquid Processing*, Harvest Horticultural Holdings Limited, May 1988.

Primary Examiner—Paul Lieberman
Assistant Examiner—Patricia Hailey
Attorney, Agent, or Firm—Nilles & Nilles

[57] ABSTRACT

A counterflow single-screw extractor includes a screw conveyor having a helical scroll formed from arcuate flight sections each having a plurality of elongated slots extending away from the direction of screw rotation and permitting the flow of effluent through the product and the flights in a manner controlled by the size, number, and orientation of the slots. The slots permit efficient extraction using relatively little extraction medium and at the same time permit a single-screw extractor to be used without having to periodically reverse the direction of screw rotation to unclog the slots and by the pitch of the screw conveyor. The inventive arrangement permits the use of a multi-section extractor employing different extraction media and/or different extraction media wash rates in different sections of the extractor.

25 Claims, 12 Drawing Sheets

METHOD AND APPARATUS FOR EXTRACTING SOLUBLE AND DISPERSIBLE MATERIALS FROM PRODUCTS USING A SLOTTED SCROLL EXTRACTOR

BACKGROUND OF THE INVENTION

1. Field of the Invention

The invention relates to a method and apparatus for extracting materials from products and, more particularly, relates to a slotted scroll, single-screw counterflow extractor for removing soluble and dispersible materials such as sugar, color, and oil from products such as sugar beet peels, citrus peels, citrus concentrate, or the like.

2. Discussion of the Related Art

Screw operated devices are well known for removing soluble or dispersible materials from products. Such devices are typically called "presses" when used to remove mechanically dispersible materials from products, e.g., by compression, and are typically called "diffusers" when they are used to remove soluble materials from the products by dissolving the materials. The present invention is usable with both types of systems and will hereafter be designated an "extractor" for the sake of conciseness.

Extractors typically remove materials from products via a counterflow washing process in which an extraction medium such as water flows downwardly through an inclined housing while the product containing the materials to be extracted is conveyed upwardly through the flowing extraction medium. The counterflow extractor most commonly employed is the so-called "twin screw" extractor, an example of which is disclosed in U.S. Pat. No. 2,573,982 to Silver (the Silver patent). The extractor disclosed by the Silver patent includes a bifurcated trough-type housing having two parallel screw-type conveyors mounted therein in parallel with one another. Each conveyor has a rotatable shaft and a helical scroll which is formed from connected flights and which is mounted on the shaft. The scrolls of the conveyors present intermeshing flights which convey the products through the housing in unison without the product short circuiting between the flights.

In use, sugar beet cassettes or the like are fed into the lower end of the housing and are conveyed by the twin screws into and along a submerged course in an enriched solution designed to dissolve the sugar in the beets. The cassettes are conveyed progressively upwardly through the housing by the helical scrolls in counter-current relation to the liquid in the housing. Steam is delivered into and circulates through jackets surrounding the housing to maintain the desired temperature in the treatment zone. Fluid flow into and out of the housing is carefully regulated to maintain the liquid solution level in the housing to at least substantially fill the lower end of the housing and to fill more of the housing as may be required for sugar extraction.

The traditional twin screw extractor suffers from several drawbacks and disadvantages the most significant of which is that high levels of water are required for extraction because, in those portions of the extractor which are not submerged, the water and product flowing through the extractor simply flows between the two screws rather than through the products subject to diffusion. Significant diffusion takes place only in those portions of the screws which are at least partially submerged such that water must percolate through the fibrous products rather than simply run between the screws. This not only requires the use of high volumes of water, but also requires high energy expenditure to heat the water to the temperatures required for adequate diffusion.

The amounts of water or other liquids required for extraction can be reduced by using a single-screw extractor of the type disclosed in U.S. Pat. No. 4,363,264 to Lang et al. (the Lang et al. patent). The extractor disclosed in the Lang et al. patent includes an elongated trough-shaped housing in which is disposed a rotatable screw conveyor having a rotatable shaft on which is mounted a slitted helical scroll. The housing is inclined with a fibrous product inlet and liquid materials outlet located at its lower end and a fibrous product outlet and a wash water inlet at its upper end. The flights of the screw conveyor each have a plurality of concentric arcuate slits formed therein permitting the flow of water or other extraction medium through the flight and the product being treated.

In use, a product such as grapes to be subjected to the pressing or extraction process is fed into the lower end of the housing and conveyed upwardly through the housing by rotation of the screw conveyor. Heated water is fed into the upper end of the housing and flows through the product in a counter-current fashion, thus removing dispersible and soluble materials from the product. The treated product is then discharged from the upper end of the housing, and the extraction medium and extracted materials (which together form an effluent) are discharged from the lower end of the housing. Effluent flow through the housing is permitted by the circumferential slits in the flights.

The counterflow single-screw extractor disclosed by the Lang et al. patent exhibits fewer short circuiting problems than do twin screw extractors such as those disclosed by the Silver patent and thus require less extraction medium. In fact, the flow of the extraction medium through the flights can be reduced to the point that it is not necessary to submerge completely any portion of the screw. The extractor disclosed by the Lang et al. patent does, however, exhibit several drawbacks and disadvantages. Most notably, the fibrous product tends to compact while it is conveyed through the housing and to pile up on one side of the housing, thus permitting extraction medium to flow unimpeded along the other side of the housing. In addition, since the slits are circumferential and thus necessarily extend in the direction of screw rotations, these slits become clogged by the compacted product. The short circuiting problem is alleviated by periodically stopping the conveyor and permitting the product to fall by gravity back to the other side of the housing. However, the slit clogging problem can be solved only by periodically reversing the direction of the screw such that specially designed ribs bite into the compacted mass and redistribute the product in the housing, thus unclogging the slits. This necessarily requires the use of a bi-directional drive and also significantly decreases the rate at which extraction occurs.

The slit clogging problem encountered by the extractor disclosed in the Lang et al. patent is also encountered by other known single-screw counterflow extractors having perforated scrolls or scrolls with circular holes.

Another problem associated with the process disclosed in the Lang et al. patent is that it is usable with only a single slit configuration and thus cannot be tailored to meet the needs of different products. For instance, a product which is not ground to a uniform mass but which has some higher density, relatively large particles and some lower density, small particles is difficult to treat using the slit configuration disclosed by the Lang et al patent. When such a product is conveyed through the housing by the screw conveyor, the smaller, denser particles tend to migrate towards the bottom or outer portion of the trough, and the lighter particles tend to migrate to the center. Since all of the slits of the Lang et al. patent are of an equal diameter, the inner slits tend to become clogged by the larger particles while the smaller particles or fines wash through the outer slits.

Still another disadvantage of the system of Lang et al. patent is that it is incapable of performing a multistage extraction process using a single extractor. A multistage extraction process is one which treats a product in distinct stages using different extraction media and/or different extraction techniques at various stages. The extractor of the Lang et al. patent is incapable of performing such a process because it has only a single effluent outlet and is incapable of controlling the flow of extraction medium through the housing after it is fed into the extraction medium inlet.

Objects and Summary of the Invention

It is therefore an object of the invention to provide a process of efficiently extracting materials from a product in a counterflow single-screw extractor using relatively small amounts of extraction medium.

Another object of the invention is to provide an extraction process of the type described above which does not require periodic reversal of the screw.

In accordance with a first aspect of the invention, these objects are achieved by feeding the product into an inlet of an extractor comprising a housing having a screw conveyor rotatably mounted therein. The screw conveyor includes a rotatable shaft having generally transverse flights mounted thereon, the flights having elongated slots formed therethrough extending in a direction counter to the direction of shaft rotation. Subsequent steps include conveying the product through the housing in a first direction by rotating the shaft, feeding an extraction medium into an extraction medium inlet of the housing, and conveying the extraction medium through the housing in a direction opposite to the first direction by alternately forcing the extraction medium through the product and through the slots in the flights, thereby extracting the substance from the product.

Because the slots extend counter to the direction of screw rotation, they do not become clogged during the extraction process. It is therefore unnecessary to periodically reverse the direction of screw rotation. At worst, it may, depending upon the properties of the product being treated, sometimes be necessary to periodically stop screw rotation so as to permit product which is accumulated on one side of the housing to fall by gravity to the other side of the housing.

Another preferred step includes heating the interior of the housing to promote extraction. The heating step preferably comprises conveying heated water through an insulated jacket surrounding at least a portion of the housing.

Still another object of the invention is to provide a multistage extraction process requiring only a single counterflow single-screw extractor to perform the process.

In accordance with another aspect of the invention, this object is achieved by feeding the product into an inlet of an extractor comprising a housing having a screw conveyor rotatably mounted therein and extending through first and second sections thereof, the screw conveyor including a rotatable shaft having generally transverse flights mounted thereon, and the flights having passages formed therethrough for the passage of an extraction medium. Subsequent steps include conveying the product through the housing in a first direction by rotating the shaft, feeding an extraction medium into an extraction medium inlet of the housing, conveying the extraction medium through the housing in a direction opposite to the first direction by alternately forcing the extraction medium through the product and through the slots in the flights, thereby extracting the substance from the product and forming an effluent, and removing at least a portion of the effluent from the housing between first and second axially aligned and adjacent sections. Extraction medium is preferably conserved by recycling at least a portion of the extraction medium from the effluent back into the housing. Effluent removal is preferably aided by compressing the product at a junction between the first and second sections.

Still another object of the invention is to provide a counterflow single-screw extractor capable of efficiently extracting materials from a product.

Still another object of the invention is to provide an extractor of the type described above which (1) can be tailored to meet the extraction needs of a particular product, and/or (2) can be used to perform a multistage extraction process.

In accordance with yet another aspect of the invention, these objects are achieved by providing an extractor comprising 1) a housing having located proximate a first end thereof a product inlet and an effluent outlet and having located proximate a second end thereof a product outlet and an extraction medium inlet, and 2) a screw conveyor rotatably mounted in the housing. The screw conveyor includes a rotatable shaft and a plurality of flights mounted generally transversely on the shaft, each of the flights having elongated slots formed therethrough extending in a direction counter to the direction of shaft rotation.

To tailer the extractor to meet the requirements of a particular process, the slots may extend radially and may have a constant width or may taper towards the screw shaft and/or away from the screw shaft. The slots may also extend at an oblique angle for maximum wash, so long as they do not extend in or near the direction of screw rotation.

The extractor may have first and second sections arranged in series so as to permit multistage extraction. The flights in the first and second sections may have different configurations of slots to provide different extraction operations in the first and second sections. Preferably, the housing has a transition section located between the first and second sections and the housing and the flights having reduced cross sections in the transition section for compressing the materials in the transition section and aiding in effluent removal.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts through out, and in which.

DETAILED DESCRIPTION OF THE PREFERRED EMBODIMENTS

1. Resume

Figure 1:
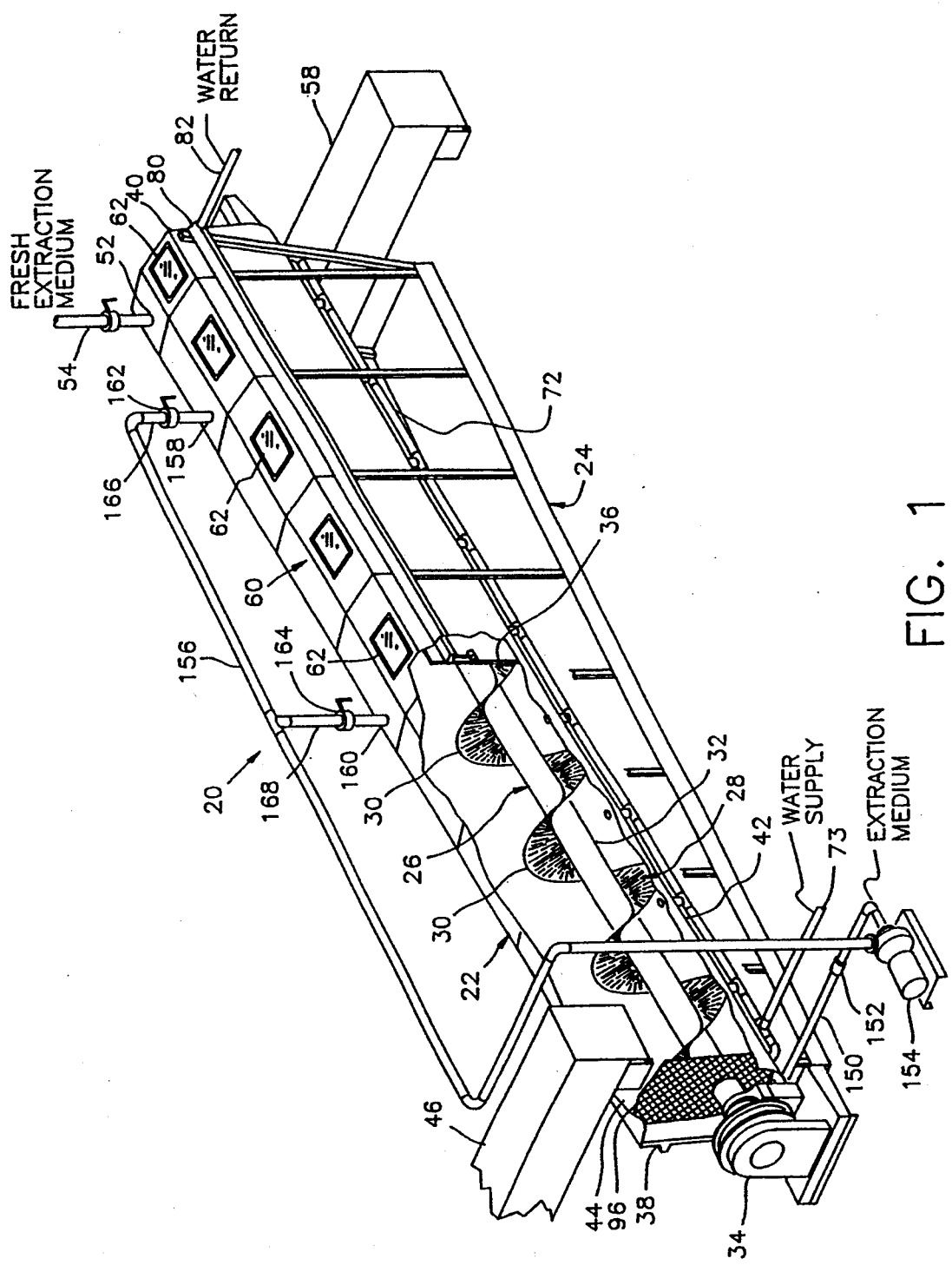
FIG. 1 is a partially cut-away perspective view of a counterflow single-screw extractor constructed in accordance with a first preferred embodiment of the present invention.
Figure 2:
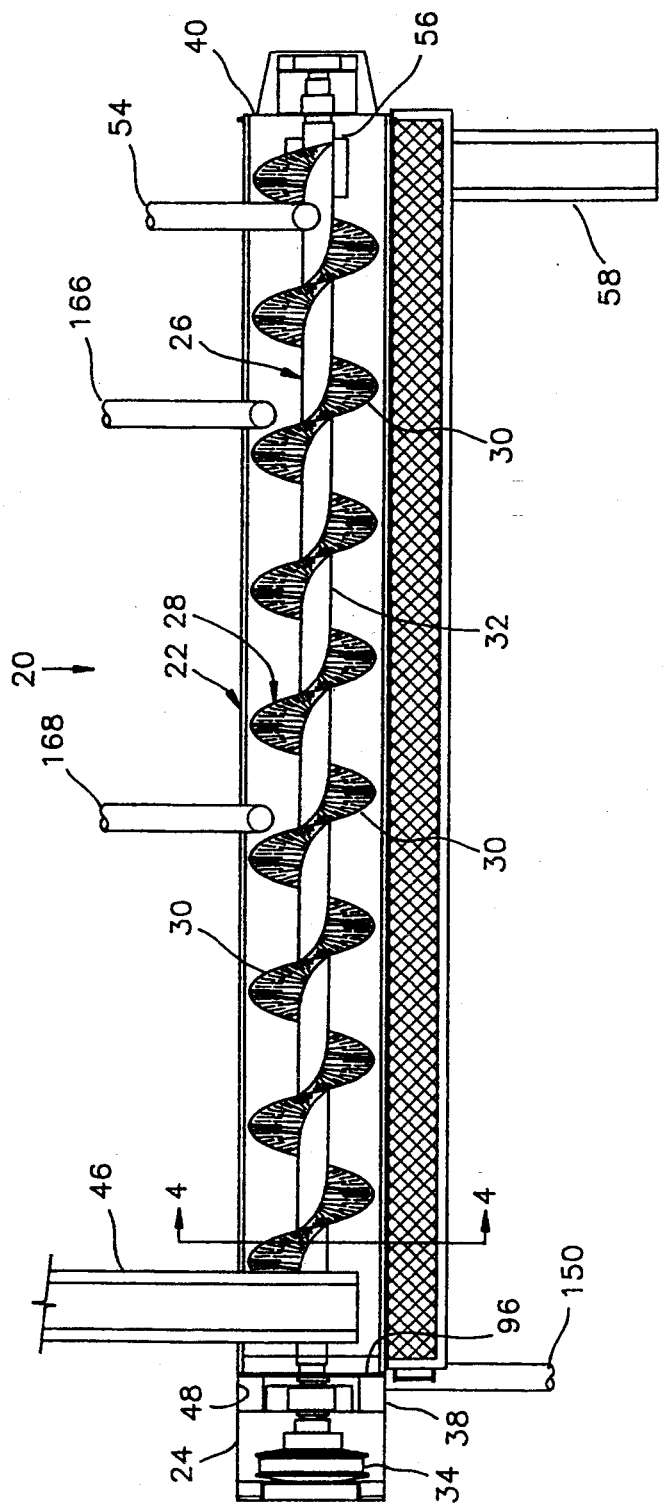
FIG. 2 is a sectional top plan view of the extractor of FIG. 1, with the water jacket and associated elements removed for the sake of illustration.

Pursuant to the invention, a counterflow single-screw extractor is provided which employs an extraction medium to remove soluble or dispersible materials from a product as the product is conveyed by a screw conveyor upwardly through an inclined housing. The screw conveyor includes a helical scroll formed from arcuate flight sections each having a plurality of elongated slots extending away from the direction of screw rotation and permitting the flow of effluent through the product and the flights in a manner controlled by the dimension, number, and orientation of the slots and by the pitch of the screw. The slots permit efficient extraction using relatively little extraction medium and at the same time permit a single-screw extractor to be used without having to periodically reverse the direction of screw rotation to unclog the slots. The inventive arrangement permits the use of a multi-section extractor employing different extraction media and/or different extraction media wash rates in different sections of the extractor.

2. Construction and Operation of Single Stage Extractor a. Construction

Referring now to FIGS. 1-11, a counterflow single-screw extractor 20 is illustrated for the removal of dispersible or soluble materials from products. "Dispersible" materials include fines, fiberous substances, and any other non-soluble material mechanically removable by washing. Extractor 20 includes an inclined trough-shaped housing 22 mounted on a support frame 24 and receiving a rotary screw conveyor 26. The screw conveyor 26 presents a continuous helical scroll 28 formed from a plurality of flights 30 which are mounted on a shaft 32 and which, when viewed from the end, are generally annular. Screw conveyor 26 is driven by a drive system 34 mounted on the support frame 24. Drive system 34 could be a hydraulic motor, an electric motor, or any other assembly capable of imparting unidirectional rotational motion to the screw conveyor 26. An insulated jacket 36 surrounds the lower portion of the housing 22 for heating or cooling the interior of the housing 22.

Housing 22 could be virtually any structure capable of 1) receiving screw conveyor 26, 2) permitting the conveyance of a product from the lower or back end 38 to the upper or front end 40 thereof, and 3) permitting an extraction medium to flow countercurrently through the product in the housing. For instance, housing 22 could take the form of a sealed cylinder or the like and could be pressurized or subjected to a partial vacuum. In the illustrated embodiment, housing 22 is generally U-shaped such that approximately one half of each of the flights 30 is disposed adjacent an inner wall 42 of the housing. The housing 22 is typically inclined at an angle of as much as 90° to permit an extraction medium to flow through the housing. Disposed at the back end 38 of housing 22 are an upper product inlet 44 (fed by a conveyor 46) and a lower effluent outlet 48 emptying into a drain pipe 150. Disposed in the front end 40 of the housing 22 are an upper fresh extraction medium inlet 52 fed by a pipe 54, and a lower product outlet 56 emptying into a take-out conveyor 58. Housing 22 could be open but is preferably capped by a lid 60 having plexiglas view ports 62 located therein for permitting the operation of the extractor 20 to be observed.

Figure 4:
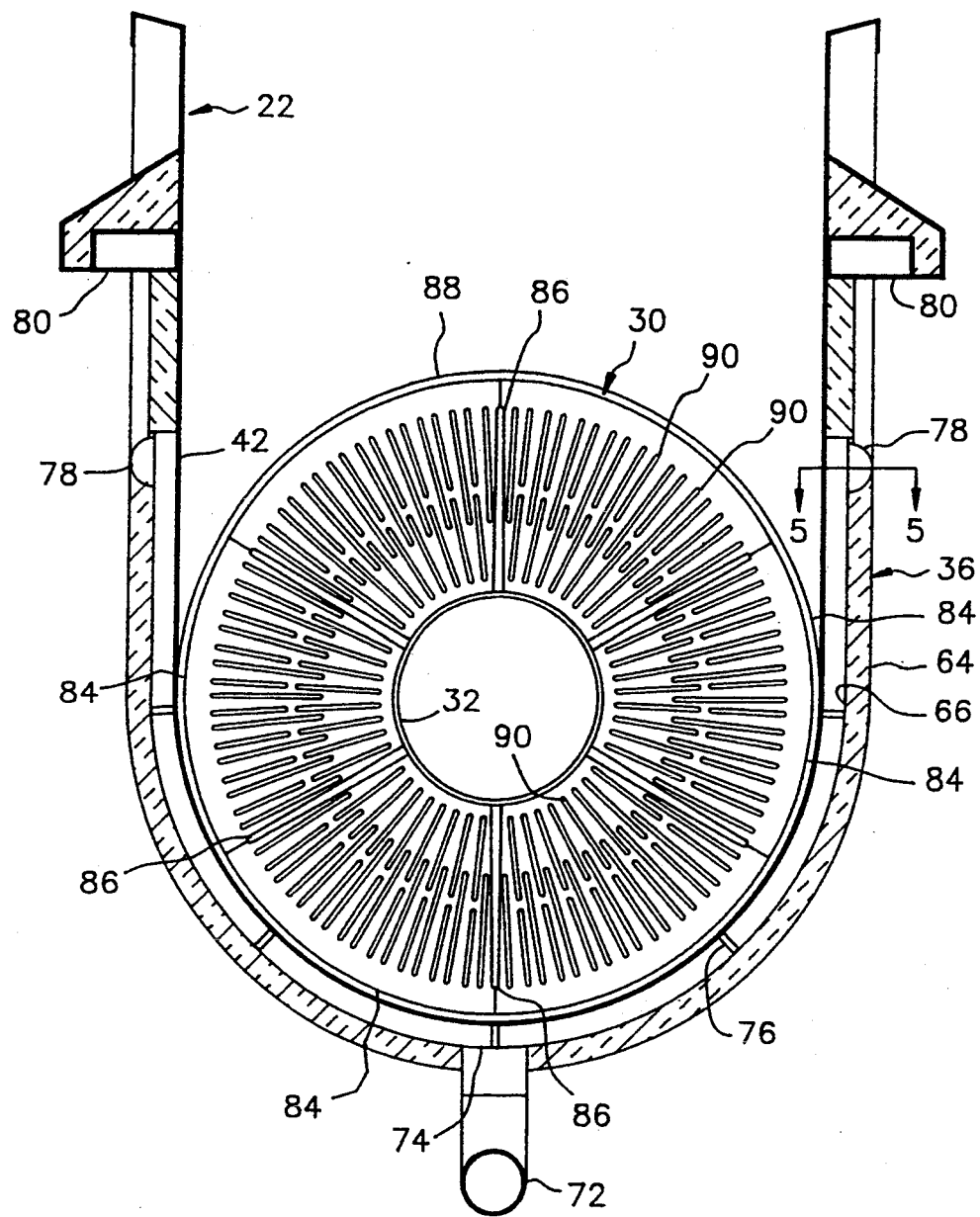
FIG. 4 is a sectional end view taken along the lines 4—4 in FIG. 2.
Figure 5:
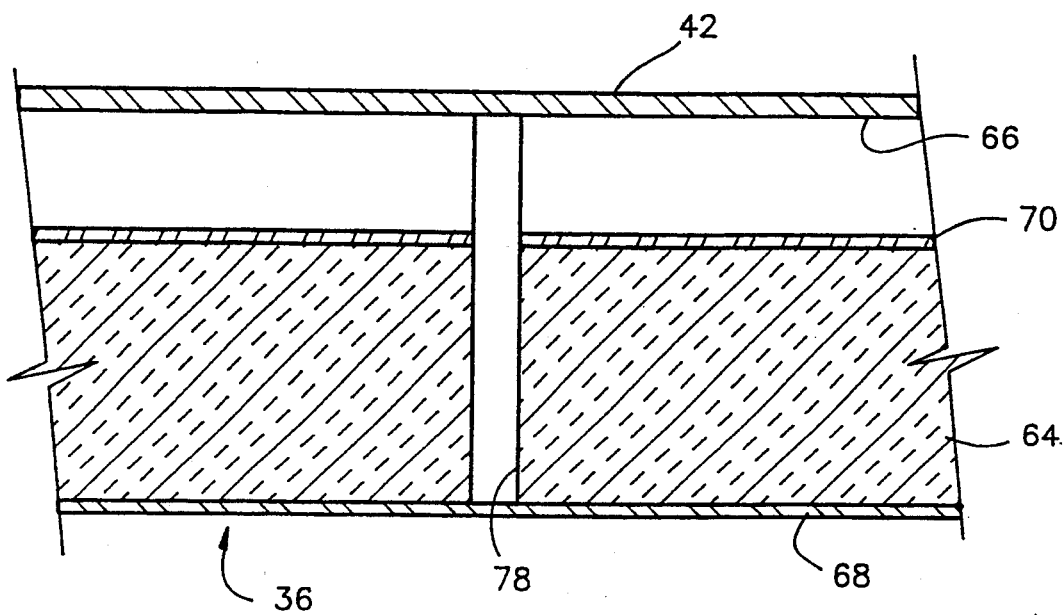
FIG. 5 is a sectional view taken along lines 5—5 in FIG. 4.

Referring particularly to FIGS. 1, 4, and 5, jacket 36 is designed to heat or cool indirectly the interior of the housing 22 by permitting the continuous flow of a heating or cooling medium along the outer surface of the inner wall 42 of the housing 22. The jacket 36 could accommodate steam, water, or any heat transfer medium, and could also operate under pressure or even under a vacuum. The jacket 36 will typically contain hot water and, for the sake of convenience, will henceforth be referred to as a "water jacket" with water being referred to as the heating medium.

Water jacket 36 is formed from a generally U-shaped insulated sleeve 64 spaced from the wall 42 of housing 22 so as to form a chamber 66 therebetween. Insulated sleeve 64 is flanked by sheet metal support plates 68 and 70 or the like of sufficient rigidity to hold the sleeve 64 in position. A system of pipes 72 feed heated water under pressure into the chamber 66 from a feed pipe 73 through a plurality of inlet ports 74 (FIG. 4) spaced along the bottom housing 22. Baffles 76 protrude into the chamber 66 to promote the circuitous flow of water through the chamber 66 and to prevent the heated water from short circuiting directly to outlets 78. Outlets 78 extend through the upper edge of the insulated sleeve 64 and communicate with a discharge manifold 80 which is connected to an appropriate return pipe 82.

Figure 3:
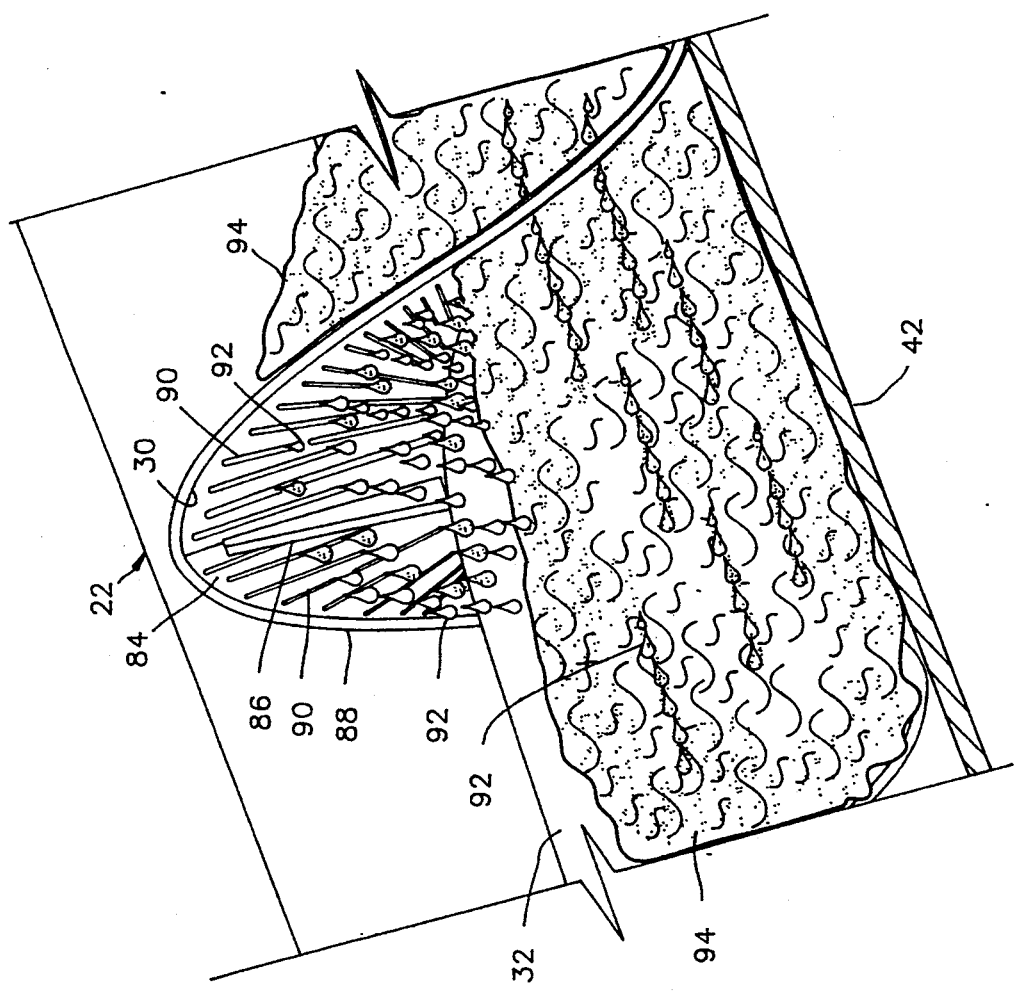
FIG. 3 is an enlarged sectional elevation view illustrating the operation of a portion of the extractor of FIGS. 1 and 2.
Figure 6:
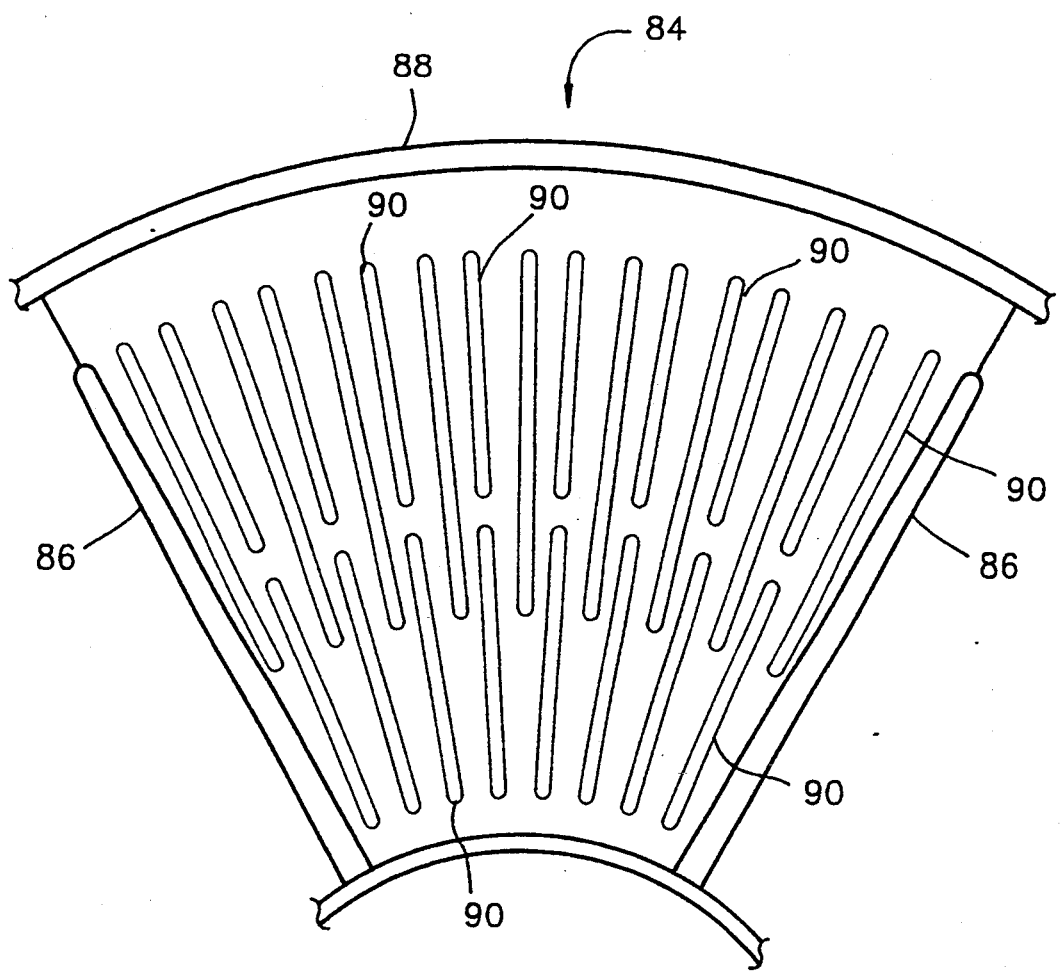
FIG. 6 is a detail view of a section of a flight of the extractor of FIGS. 1-5 and illustrating a first preferred slot configuration.

Referring now particularly to FIGS. 3, 4, and 6, each of the flights 30 includes a plurality of generally arcuate sections 84 formed from sheet metal or the like and connected at its inner radial end to the shaft 32 and at its arc edges to radial support rods 86 connecting it to adjacent flight sections. Teflon ® scrapers 88 are preferably attached to the outer periphery of each of the sections 84 and sealingly slide against the inner surface of the wall 42 of housing 22, thus preventing fluids flowing through the housing 22 from bypassing the slots in the flights (detailed below).

A plurality of elongated slots 90 is formed in each of the flight sections 84 so as to permit the flow of extraction medium through the flights 30 at a controlled manner determined by the dimension, number, and orientation of slots 90. The flow rate of extraction media through the slots is controlled by slot dimensions (particularly width) and slot number, and the flow gradient is controlled by slot orientation relative to extraction medium flow. These characteristics will vary from application to application to meet the needs of a particular process. It is preferred, however, that, in order to prevent clogging of the slots while permitting uniform fluid flow through the flights 30, they 1) be elongated rather than being circular or being formed from small perforations as in a screen, 2) be straight or linear rather than arcuate, and 3) extend away from or non-parallel to the direction of screw rotation. "Away" as used herein thus means that the leading edge of each slot extends at an angle with respect to direction of conveyance. Radial slots thus extend perpendicularly from the direction of the conveyance and are the least prone to clogging.

In the embodiment illustrated in FIGS. 1-6, the slots 90 are designed to provide uniform flow of extraction medium and extracted materials (collectively known as an "effluent") through the flights 30 while assuredly avoiding clogging. To this end, the slots 90 extend radially along the flights 30, are of a constant width, and are distributed evenly around the circumference of the flights 30. The illustrated slot configuration is formed from patterns of a relatively long slot extending only part-way to the inner radial end of the flight section flanked by collinear shorter slots the inner one of which terminates proximate the inner radial end of the flight section 84 and the outer one of which terminates proximate the outer radial end of the flight section 84. This configuration has been found to provide the most uniform extraction possible. The illustrated configuration is also well suited for the extraction of materials from a product having a consistent particle size with a relatively small percentage of fines so as to permit a generally uniform flow rate through the entire cross section of the product.

The extraction characteristics can also be set by setting the pitch of the screw conveyor 30. That is, the pitch of the screw determines the functional surface area of the materials subject to extraction. A screw with a relatively high pitch presents a relatively high number of flights and accordingly subjects greater surface areas of products to extraction media flow. As a rule, the required functional surface area increases with the particle size gradient. Thus, a product having significant percentages of both small, dense particles and large, light-weight particles should be treated with a screw conveyor having a relatively high pitch, whereas a product exhibiting relatively uniform particle size and density should be treated in a screw conveyor having a relatively low pitch.

b. Operation

The extractor 20 of FIGS. 1-6 having flights presenting slot configurations as illustrated in FIG. 6 could be used to remove by mechanical extraction or diffusion virtually any dispersible or soluble material from a product. For instance, the housing 22 could be pressurized and a suitable extraction medium could be used to extract coffee liquor and oil from coffee beans. Alternatively, the housing 22 could be oriented vertically and cooled with a glycol alcohol jacket, and a crystallized citrus slurry could be conveyed upwardly through the housing through a downwardly flowing chilled water wash. However, due to the uniform cross section and radial orientation of slots 90, the embodiment of FIGS. 1-6 is particularly well suited for the removal of sugar from sugar beet peels which are ground to a consistent particle size with a relatively small percentage of fines.

In use, sugar beet peels are ground into a pulp 94 (FIG. 3) and fed into product inlet 44 at the back end 38 of housing 22 and conveyed upwardly through the housing at a rate of, e.g., 20,000 pounds per hour (pph) as the screw conveyor 36 is driven by drive system 34 at a relatively slow rate of, e.g., 1-5 rpm. Water 92 is simultaneously fed into extraction medium inlets 52, 158, and 160 at a combined rate of, e.g., 50,000 pph. The amount of water required for extraction will actually depend on the water content of the product. The 50,000 pph flow rate is based on an assumed sugar beet peel water content level of 80%.

After being fed into the housing, the wash water flows by gravity through the pulp 94 and through the slots 90 in the flights 30 as illustrated in FIG. 3, thus dissolving the sugar in the pulp and washing it from the pulp to form an effluent. The effluent then drains through a screen 96 located at the back end 38 of housing 22 and through outlet 48 and into pipe 150. The treated pulp 94 is discharged from product outlet 56 at the front end 40 of the housing 22 and removed by conveyor 58.

Part of the water removed from the extractor is preferably recycled to conserve water. Thus, in the illustrated embodiment, the solution drained from outlet 48 by pipe 150 is treated in a manner which is per se well known by a filter 152 and associated devices such as an evaporator to separate sugar and fines from the water. A pump 154 then forces at least a portion of the clarified water through a pipe 156 and into inlets 158 and 160 of the housing 22 the openings of which are controlled by valves 162 and 164 located in branch pipes 166 and 168. The recycled water inlets 158 and 160 should be located downstream of fresh water inlet 52 so that the purest water always contacts relatively "clean" product portions (having relatively low sugar concentrations) upon injection and so that the less pure recycled water contacts "dirtier" product portions (having relatively high sugar concentrations) upon injection. Using progressively "cleaner" extraction media to treat progressively "cleaner" product portions provides the most efficient extraction and is the heart of any counterflow extraction process.

Because the slots 90 run counter—indeed perpendicular—to the direction of rotation of the screw 26, the slots 90 are not clogged by the pulp 94. Accordingly, it is not necessary to periodically reverse the direction of the screw to unclog the slots 90. Pulp 94 may, depending upon its moisture content, tend to pile up on one side of the housing 22 as it is conveyed through the housing by the screw conveyor 26. Should this be the case, screw conveyor 26 can if necessary be periodically stopped to permit the pulp to fall by gravity back to the other side of the housing 22, thus assuring uniform extraction by preventing water from short circuiting along the other side of the housing 22.

c. Variations of First Embodiment

As discussed above, a feature of the invention is that the configuration of slots in the flights can be varied to meet the needs of a particular application. Referring now to FIGS. 7-11, several such configurations will now be described with reference to flights 30A-30E, each of which is usable with the scroll 28 of the screw conveyor 26 of FIGS. 1-6.

Figure 7:
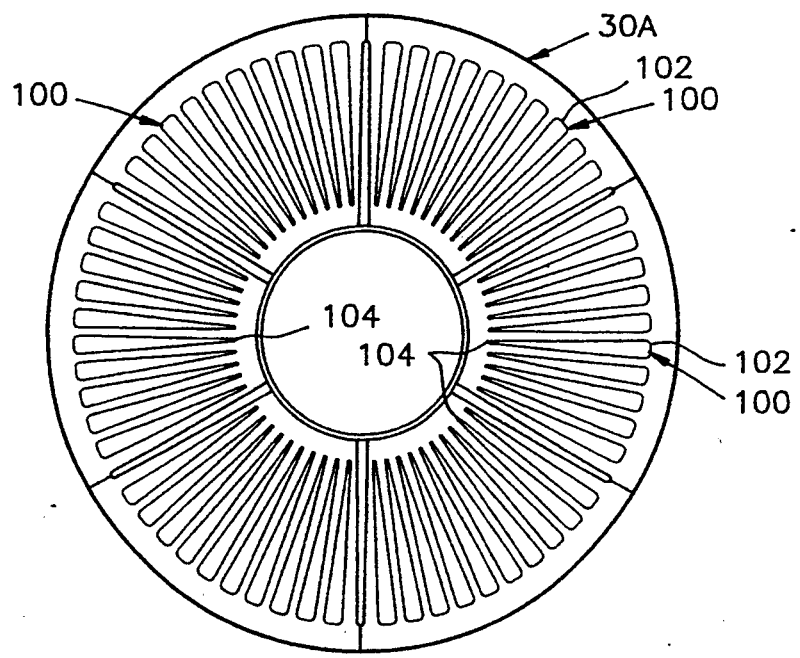
FIGS. 7-11 are end views of flights having other preferred slot configurations.

Referring to FIG. 7, flight 30A has a plurality of radial slots 100 spaced evenly around the circumference thereof each of which is tapered from its outer radial end 102 to its inner radial end 104. This slot configuration is useful for the removal of fines from products having both large, low density particles and small, high density particles. The smaller, higher density particles tend to migrate towards the bottom or outer radial portion of the housing 22 while the larger particles migrate towards the shaft 32. The illustrated tapered slots permit the fines in the smaller particles to wash through the outer, wider portions of the slots 100. This configuration also subjects the remaining larger particles to more soaking.

Notwithstanding the previous discussion, it may be desirable in some instances to provide uniform soaking of all particles without washing a significant number of fines from the system. The flight 30B illustrated in FIG. 8 thus has slots 106 formed therein which taper outwardly from their outer radial ends 108 to their inner radial ends 110. The narrow outer slot portions inhibit fines from washing therethrough, and the wider inner slot portions permit the extraction medium to flow through the larger particles at a higher rate, thus providing uniform washing.

Figure 8:
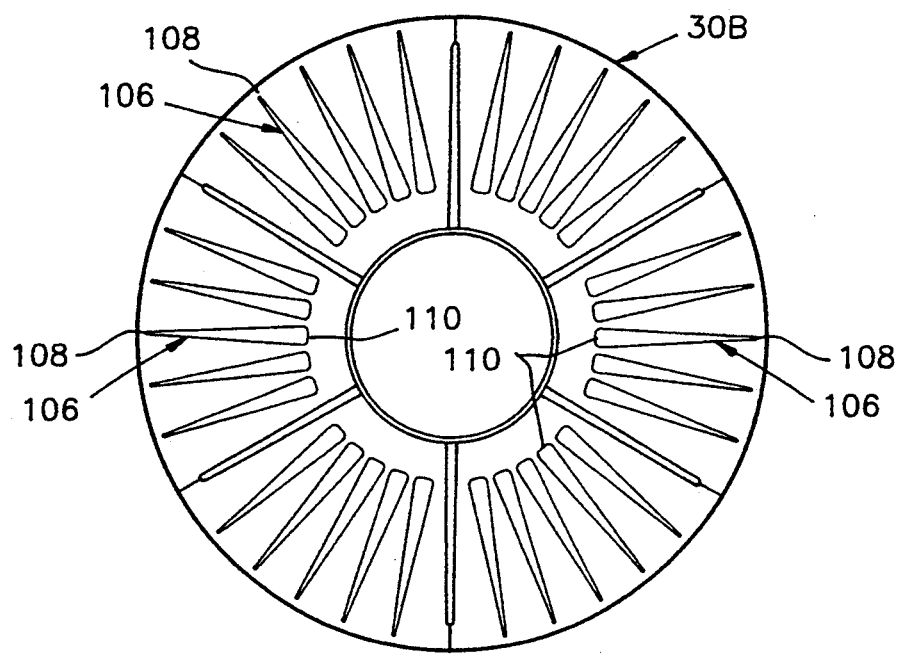
Figure 9:
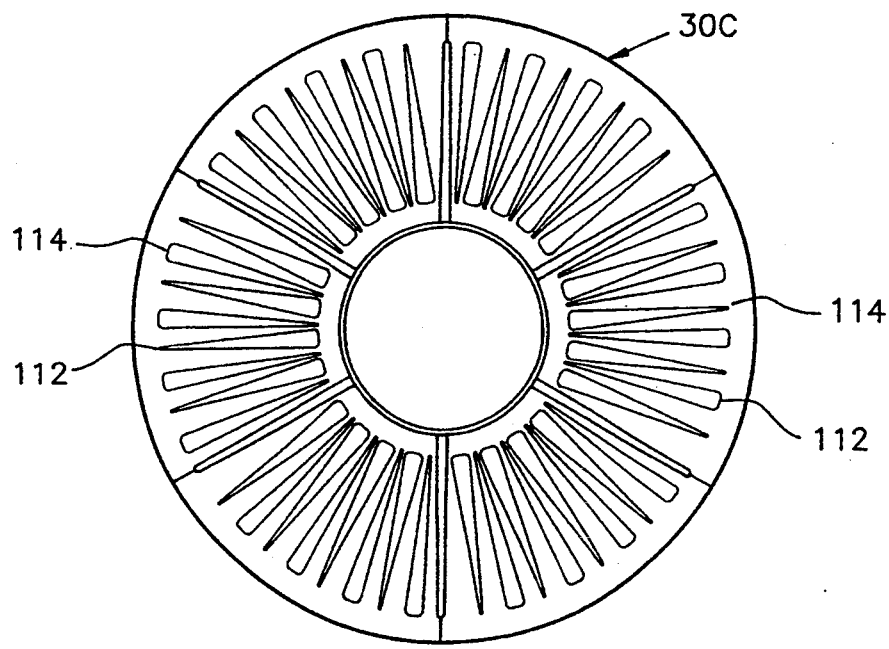

Maximum fines extraction could also be assured by combining the designs of FIGS. 7 and 8 to provide a slot configuration as illustrated in FIG. 9 in which the flight 30C is formed with a series of first and second alternating slots 112 and 114. The slots 112 taper inwardly from their outer ends to their inner ends, while the slots 114 taper outwardly from their outer ends to their inner ends. Light fines floating to the product surface wash through the inner portions of slots 114, and dense fines working to the outer portion of the product wash through the outer portions of slots 112.

It should be noted that it is not necessary that the slots extend radially. In fact, slots could extend at virtually any angle so long as they do not extend in the direction of screw rotation (although the danger of slot clogging increases as the angle of inclination approaches the direction of screw rotation). For instance, referring to FIG. 10, elongated slots 116 could be provided in a flight 30D which do not extend radially but which are angled counter to the direction of screw rotation as illustrated. This slot configuration would be used when the extractor is extracting materials from a relatively constant :sized granular product and would provided maximum wash through the granular product. In fact, the illustrated configuration provides the maximum extraction possible without actually using circular holes and without subjecting a high percentage of fines to washing through the slots.

Figure 10:
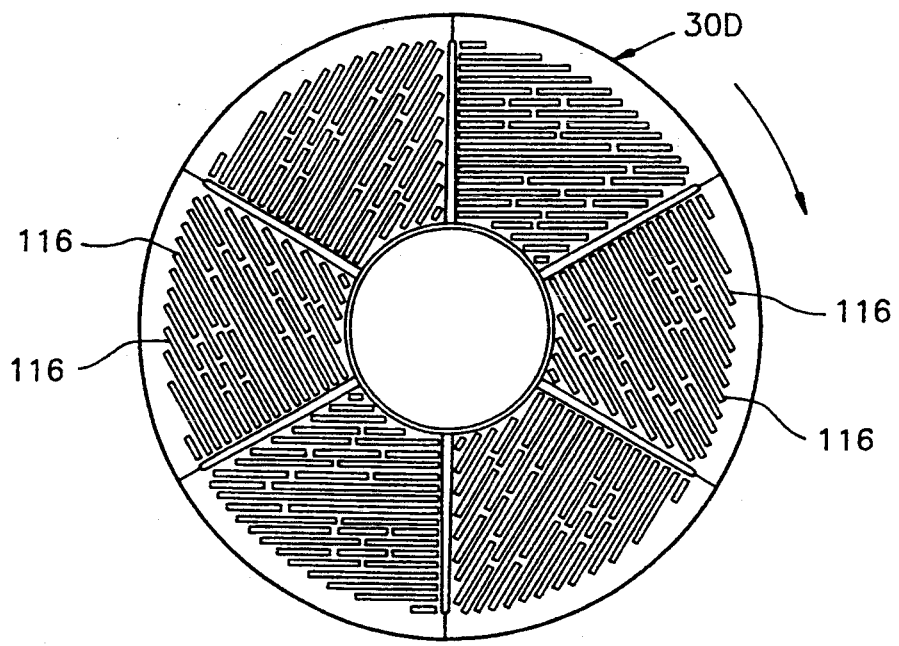
Figure 11:
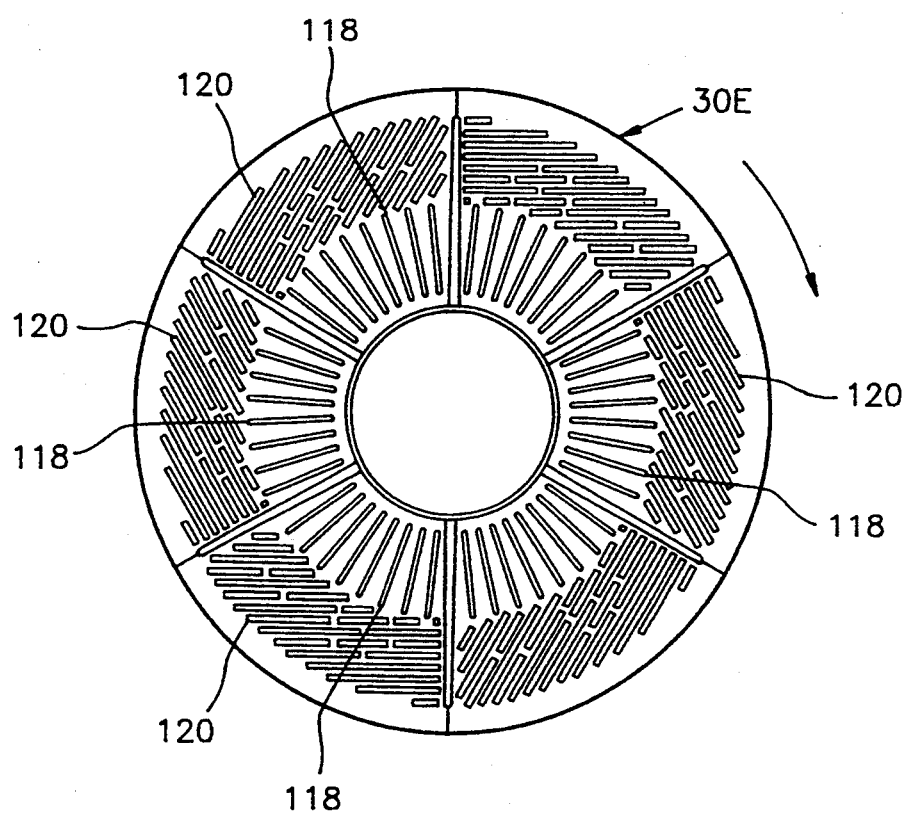

Finally, referring to FIG. 11, a combination of radial slots 118 and angled slots 120 could be employed in a flight 30E to combine the benefits of the configuration illustrated in FIG. 6 with that illustrated in FIG. 10.

3. Construction and Operation of Multistage Extractors

An advantage of the inventive extractor is that multistage extraction can be performed employing a single counterflow single-screw extractor. A "stage" as used herein means a calculated amount of material extraction using a designated extraction medium flowing at a designated rate. A multistage process is thus one in which different extraction media and/or different extraction media flow rates are employed at different points in the process. Two processes and the extractors for performing these processes will now be described.

a. Single-Medium Multistage Extractor

Figure 12:
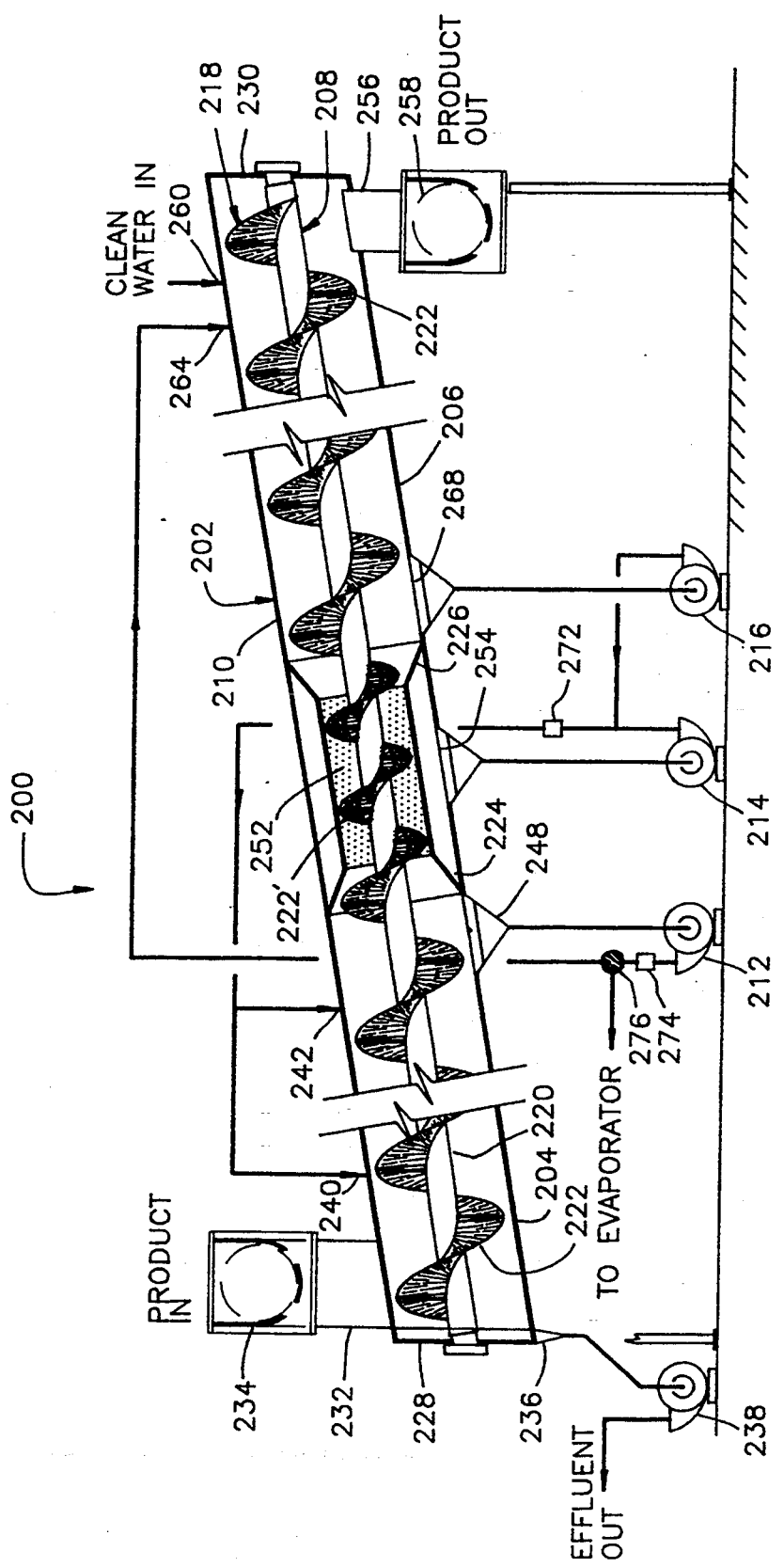
FIG. 12 is a partially schematic sectional elevation view of a two-section counterflow single-screw extractor constructed in accordance with a second preferred embodiment of the invention.
Figure 13:
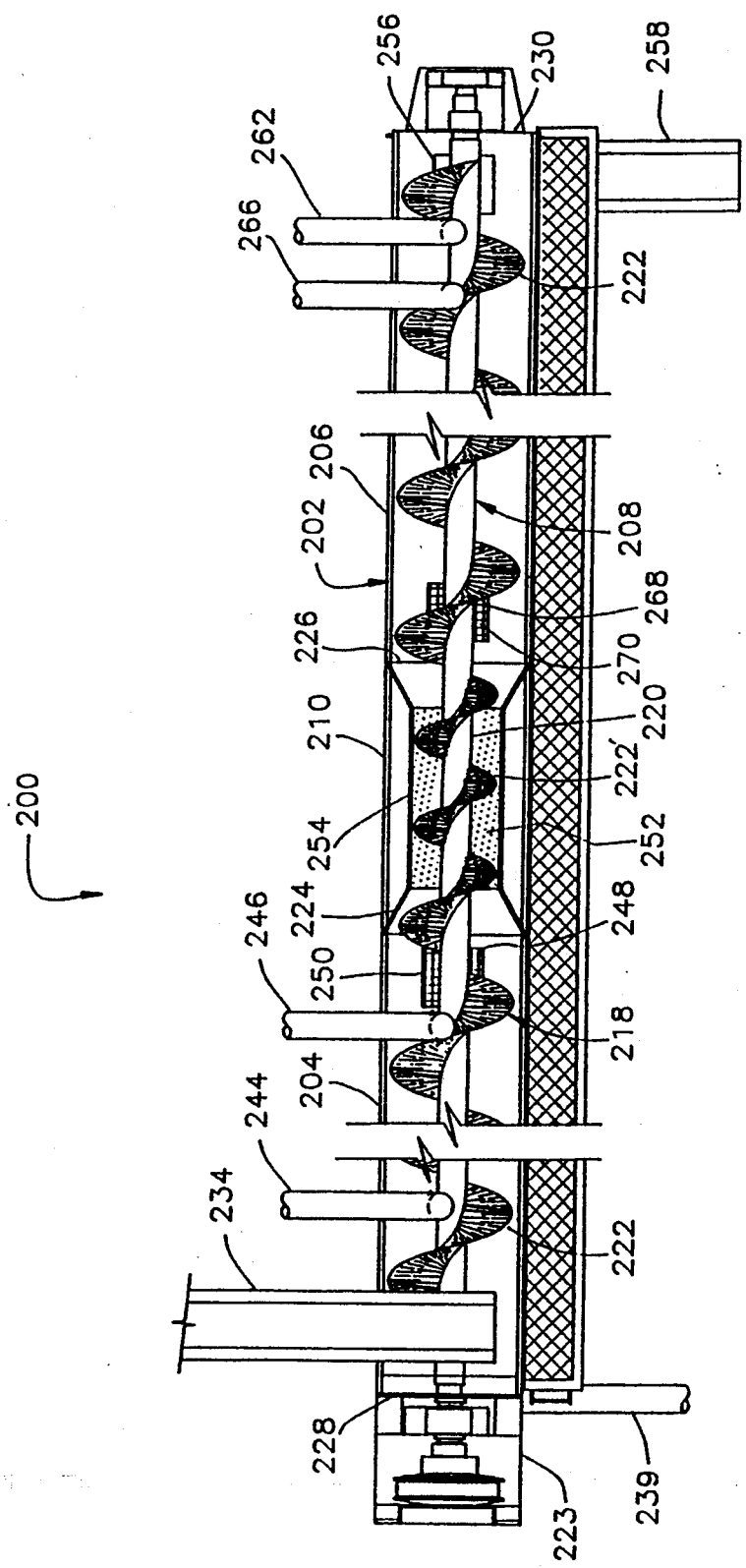
FIG. 13 is a sectional plan view of the extractor of FIG. 12.

Referring now to FIGS. 12 and 13, a two-section extractor 200 is illustrated using a single extraction medium such as water in each of the two sections. Extractor 200 includes a trough-shaped housing 202 divided into first and second sections 204 and 206 and receiving a single-screw conveyor 208. A transition section 210 is disposed between the first and second sections 204 and 206 of housing 202 and is of a reduced cross section when compared to that of the sections 204 and 206. A system of pumps 212, 214, and 216 control in part the flow of extraction medium to and from the first and second sections 204 and 206 and transition section 210.

Screw conveyor 208, like the conveyor 26 described above, includes a continuous helical scroll 218 mounted on a rotatable shaft 220 and formed from a plurality of connected generally annular flights 222 each having slots formed therein for the passage of extraction medium. Conveyor 208 is driven by a suitable drive system 223 which, like that of the first embodiment, need not be reversible.

Housing 202 is similar in construction to the housing 22 of the first embodiment but is of a reduced diameter in the transition section 210 so as to define at the opposed ends thereof a front end 224 of the first section 204 and a rear end 226 of the second section 206. The first and second sections 204 and 206 also have respective rear and front ends 228 and 230 defined by the ends of the housing 202. A water jacket, though not illustrated, is preferably provided to heat the interior of housing 202. Each of the first section 204, second section 206, and transition section 210 will now be described.

First section 204 is designed to perform the bulk of material extraction. Materials in this section are thus subject to relatively high extraction media flow rates for maximum washing. First section 204 includes at the rear end portion 228 thereof an upper product inlet 232 fed by a screw conveyor 234 and a lower effluent outlet 236 connected to a pump 238 via a pipe 239. Recycled extraction media inlets 240 and 242 are formed in the first section 204 and are fed by pipes 244 and 246. An effluent outlet 248 is provided in section 204 fluidically upstream of inlets 240, 242 and communicates with the pump 212 via a screen 250. The front end 224 defines a product outlet.

Transition section 210 is designed to compress the product so as to squeeze retained effluent from the product. To this end, section 210 is of a reduced diameter and receives flights 222' which are of a reduced diameter but which are otherwise identical to the remaining flights 222. A U-shaped screen 252 extends essentially through the entire length of transition section 210 so as to permit the flow of effluent out of an outlet 254 and into pump 214.

Second section 206 has a product inlet defined by the rear end 226 thereof and a product outlet 256 formed at the bottom of the front end 230 thereof and communicating with a take-out screw 258. Section 206 also has a fresh extraction media inlet 260 fed by a pipe 262, a recycled extraction medium inlet 264 fed by a pipe 266, and an effluent outlet 268 cooperating with a screen 270 located at the rear end 226 of second section 206 and directing effluent removed from the housing 202 to the pump 216.

The two-section extractor 200 illustrated in FIGS. 12 and 13 is designed to conserve extraction medium by removing the medium at one point in the system and placing it back in at another point after it has been suitably filtered. Extractor 200 is thus ideally suited to remove sugar from citrus products such as lemon peels and lime peels. To maximize extractor efficiency, the flights of the first section 204 have a slot configuration corresponding to that illustrated in FIG. 9 to maximize the washing of sugar and fines from the peels, and the scrolls of the section 206 have a slot configuration corresponding to that illustrated in FIG. 10 to promote maximum extraction while minimizing the number of fines washed out of the pulp. The process of extracting sugar from lemon and lime peels will now be disclosed.

A pulp formed from ground peels is fed into the inlet 232 of the first section 204 at a rate of, e.g., 20,000 pph and conveyed through the housing 202 to the outlet 256 formed in the second section 206. Water simultaneously flows downwardly through the housing 202 at a rate of, e.g., 40,000 pph in a counterflow manner. The bulk of the sugar is removed from the peels in the first section 204 and flows with the water out of the outlet 236 in the rear end of first section 204 as an effluent. The product in the second section 206, having already been treated in the first section 204, releases relatively small amounts of extracted sugar to the effluent flowing out of outlet 268. This water in this effluent can thus be filtered in a filter 272 and returned to the inlets 240 and 242 of the first section 204, thus decreasing the amount of fresh water required for primary extraction in section 204.

The remaining liquids are squeezed out of the product as it is compacted in the reduced diameter section of the housing in the transition section 210. The water in the effluent drained from outlet 254 of this section, like the water from the second section 206, can be filtered in filter 272 and pumped back to the inlets 240 and 242 of the first section 204 by pump 214. Water in the effluent retrieved by pump 212 from first section front outlet 248 is filtered via a filter 274 and, depending upon the position of a valve 276 set to meet the requirements of a particular process, is fed either to an evaporator or recycled back into an inlet 264 of second section 206 to increase the wash water flow rate in this section without requiring additional fresh water.

b. Multimedia Multistage Extractor

A two-section extractor is also well suited for using two different extraction media in the first and second sections. For instance, it is sometimes desirable to remove colors and oils from citrus peel pulp after the sugar is removed. This removal is preferably performed with an alcohol wash which is ill-suited for removing sugar. The inventive two-section extractor is capable of performing both functions in a single counterflow extractor.

Figure 14:
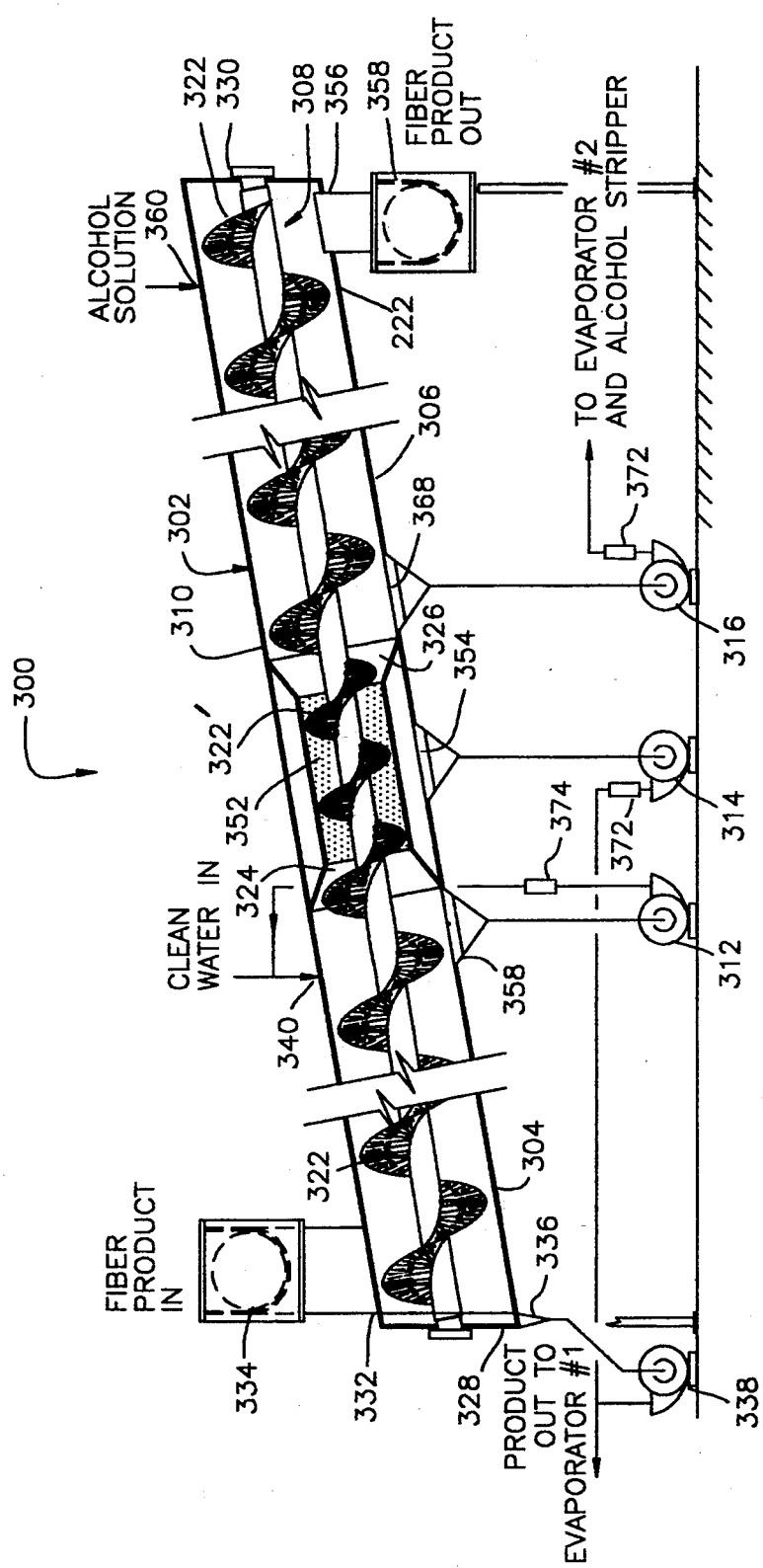
FIG. 14 is a partially schematic sectional elevation view of a counterflow single-screw extractor constructed in accordance with a third preferred embodiment of the invention.

Referring now to FIG. 14, a counterflow extractor 300 is illustrated which is identical in construction to the extractor 200 described above with the exception that materials are fed into and discharged from the system at different locations. Thus, extractor 300 includes a housing 302 divided into first and second sections 304 and 306 by a transition section 310 of reduced diameter and receiving a section of a conveyor 308 having flights 322' of a diameter which is reduced compared to the diameter of the flights 322 of the remainder of the conveyor. Elements in the extractor 300 corresponding to those of the extractor 200 described above are designated by the same reference numerals, incremented by 100.

Extractor 300 differs from the extractor 200 of the embodiments of FIGS. 12 and 13 primarily in that the first section 304 is fluidically isolated from the second section 306. Specifically, the outlets of the pumps 314 and 316 are connected to separate evaporators through filters 372, 372' rather than to the extraction medium inlet 340 of the first section 304. The reasons for this distinction will become more apparent from the following description of the operation of extractor 300.

In use, citrus pulp is fed into the product inlet 332 at the rear end 328 of section 304 by a conveyor 334 at a rate of, e.g., 20,000 pph and conveyed through the housing 302 to the product outlet 356 at the front end 330 of section 306 by the conveyor 308 while two different extraction media flow countercurrently through the respective housing portions 304, 306. Specifically, heated water is fed through section 304 and an alcohol solution or another suitable solvent is fed through section 306. These process will now be detailed.

Heated water is fed into extraction medium inlet 340 at the front end 324 of section 304 and flows downwardly through section 304 at a total rate of, e.g., 40,000 pph so as to dissolve the sugar in the pulp and so as to wash the fines from the pulp. Some of this water is fresh, and the remainder is supplied by pump 312 which recycles water removed through outlet 358 and filtered in a filter 374. Preferably, the slots in the flights 322 in section 304, like those in section 204 of the embodiment of FIGS. 12 and 13, assume the slot configuration of FIG. 9 so as to facilitate the washing of sugar and fines from the system. The sugar and fines wash with the effluent out of outlet 336 and are removed by a pump 338.

In transition section 310, the pulp is compressed in the reduced diameter portion of the housing 302 so that much of the remaining effluent is squeezed out of the peels and drains through a screen 352 and out of an outlet 354. The effluent removed from outlet 354 is fed to the inlet of pump 314 and pumped to the filter 372'. The filtered water is then fed to the first evaporator for recirculation into the system.

In the second section 306, oils and the like are removed from the pulp by an alcohol wash. To this end, the pulp is conveyed upwardly from the product inlet presented by the rear end 326 of second section 306, to the outlet 356, and out of the system by conveyor 358. A solution containing 40% alcohol is simultaneously fed into extraction medium inlet 360 formed in the front end at a rate of, e.g., 30,000–50,000 pph and flows downwardly through the housing 302 in contact with the pulp at a rate determined by the configuration of the slots in the flights 322. These slots, like the slots in the corresponding section 206 of the embodiment of FIGS.

12 and 13, preferably take the configuration illustrated in FIG. 10 to provide maximum wash. The alcohol solution and extracted oils and the like then drain as an effluent out of the section 306 through effluent outlet 368 and flow to the inlet of pump 316, which then pumps the alcohol solution to the filter 372 and then to the second evaporator and an associated alcohol recovery system.

Many changes and modifications could be made to the present invention without departing from the spirit and scope thereof. For instance, the slots in the flights are not limited to the configurations illustrated. Virtually any slot configuration could be used having elongated slots extending away from the direction of screw rotation. Moreover, where multistage extractors are being employed, the transition area need not take the form illustrated so long as the two sections can be fluidically isolated from one another. It may for instance be desirable to physically remove the product from the extractor between the sections so that secondary operations such as pressing can be performed on the product prior to being fed into, the second section. In this instance, larger screens would be provided in the front end of the first second and the rear end of the second section to facilitate extraction medium removal, and a large opening would be provided in the transition area to permit the product to fall into a sludge pump, screw conveyor, or some other device for conveying the product to the secondary device and then back to the extractor. Other modifications will become apparent from a reading of the appended claims.

I claim:

1. A method of extracting a substance from a product, comprising:
   A. feeding said product into an inlet of an extractor comprising a housing having a screw conveyor rotatably mounted therein, said screw conveyor including a rotatable shaft having generally transverse flights mounted thereon, said flights having elongated slots formed therethrough extending in a direction substantially non-parallel to the direction of shaft rotation;
   B. conveying said product through said housing in a first direction by rotating said shaft;
   C. feeding an extraction medium into an extraction medium inlet of said housing; and
   D. conveying said extraction medium through said housing in a direction opposite to said first direction by alternately forcing said extraction medium through said product and through said slots in said flights, thereby extracting said substance from said product to form an effluent.

2. A method as defined in claim 1, wherein said housing has first and second axially aligned sections, each of said first and second sections having a lower product inlet, an upper product outlet, and an upper extraction medium inlet, and further comprising the step of removing at least a portion of said effluent from said housing between said first and second sections.

3. A method as defined in claim 2, further comprising recycling at least a portion of said effluent back into said housing.

4. A method as defined in claim 2, wherein said extraction medium is fed into said extraction medium inlet of said first section, and further comprising feeding a second extraction medium into said extraction medium inlet of said second section.

5. A method as defined in claim 1, further comprising heating the interior of said housing.

6. A method as defined in claim 5, wherein said heating step comprises conveying heated water through an insulated jacket surrounding at least a portion of said housing.

7. A method as defined in claim 1, wherein said product comprises pulp formed from citrus peels, and wherein said substance comprises sugar.

8. A method as defined in claim 1, further comprising periodically stopping screw rotation and then restarting screw rotation without reversing screw rotation so as to permit product which is accumulated on one side of said housing to fall by gravity to the other side of the housing.

9. A method as defined in claim 1, wherein said slots are linear.

10. A method as defined in claim 9, whereto said slots extend radially.

11. A method as defined in claim 10, wherein said slots are tapered.

12. A method as defined in claim 9, wherein said slots are tapered.

13. A method as defined in claim 12, wherein said slots extend radially.

14. A method as defined in claim 12, wherein said slots are tapered.

15. A method of extracting a substance from a product, comprising:
   A. feeding said product into an inlet of an extractor comprising a housing having first and second axially aligned sections and having a screw conveyor rotatably mounted therein, said screw conveyor including a rotatable shaft having generally transverse flights mounted thereon, said flights having elongated slots formed therethrough extending in a direction substantially non-parallel to the direction of shaft rotation;
   B. conveying said product through said housing in a first direction by rotating said shaft;
   C. feeding an extraction medium into an extraction medium inlet of said housing;
   D. conveying said extraction medium through said housing in a direction opposite to said first direction by alternately forcing said extraction medium through said product and through said slots in said flights, thereby extracting said substance from said product to form an effluent;
   E. removing at least a portion of said effluent from said housing between said first and second sections thereof; and
   F. compressing said product at a junction between said first and second sections, said junction having a reduced cross section when compared to that of both said first and second sections, to aid in effluent removal.

16. A method of extracting a material from a product, comprising:
   A. feeding said product into a product inlet of an extractor comprising a housing having first and second axially aligned sections and having a screw conveyor routably mounted therein and extending through said first and second sections, said screw conveyor including a rotatable shaft having generally transverse flights mounted thereon, said flights having passages formed therethrough for the passage of an extraction medium, said product inlet being located at a lower end of said first housing section;

B. conveying said product through said housing in a first direction by rotating said shaft;

C. feeding said extraction medium into extraction medium inlets formed in said first and second sections of said housing;

D. conveying said extraction medium through said housing in a second direction opposite to said first direction by alternately forcing said extraction medium through said product and through said passages in said flights, thereby extracting said material from said product and forming an effluent;

E. removing at least a portion of said effluent from said housing between said first and second sections.

17. A method as defined in claim 16, further comprising recycling at least a portion of said effluent back into one of said extraction medium inlets of said housing.

18. A method as defined in claim 17, further comprising feeding a second extraction medium into said second section.

19. A method as defined in claim 16, wherein said passages comprise elongated slots extending in a direction substantially non-parallel to the direction of shaft rotation.

20. A method as defined in claim 19, Wherein said slots are linear.

21. A method as defined in claim 20, wherein said slots are tapered.

22. A method of extracting a material from a product, comprising:

A. feeding said product into an inlet of an extraction comprising a housing having first and second axially aligned sections and a screw conveyor rotatably mounted therein and extending through said first and second sections, said screw conveyor including a rotorable shaft having generally transverse flights mounted thereon, said flights having passages formed therethrough for the passage of an extraction medium;

B. conveying said product through said housing in a first direction by rotating said shaft;

C. feeding said extraction medium into an extraction medium inlet of said housing;

D. conveying said extraction medium through said housing in a second direction opposite to said first direction by alternately forcing said extraction medium through said product and through said passages in said flights; thereby extracting said material from said product and forming an effluent:

E. removing at least a portion of said effluent from said housing between said first and second sections; and F. compressing said product at a junction between said first and second sections, said junction having a reduced cross section when compared to that of both said first and second sections, to aid in effluent removal.

23. A method of extracting a sugar from pulp formed from citrus peels, comprising:

A. feeding said pulp into an inlet of a housing comprising a housing divided into first and second axially aligned sections and having a screw conveyor rotatably mounted therein and extending through said first and second sections, said screw conveyor including a rotatable shaft having generally transverse flights mounted thereon, said flights having elongated slots formed therethrough extending in a direction substantially non-parallel to the direction of shaft rotation;

B. conveying said pulp through said housing in a first direction while washing said pulp, said conveying and washing step including (1) conveying said pulp through said first section of said housing in said first direction while a first extraction medium flows through said first section of said housing in a second direction opposite to said first direction, said first extraction medium alternately flowing through said pulp and through said slots in said flights of said first section, thereby forming a first effluent, (2) compressing said pulp at a junction between said first and second sections to extract said first effluent from said pulp, (3) draining said first effluent from said housing, then (4) conveying said pulp through said second section of said housing in said first direction while a second extraction medium flows through said second section of said housing in said second direction, said first extraction medium alternately flowing through said pulp and through said slots in said flights of said second section, thereby forming a second effluent, and then (5) discharging said second effluent from said second section; and then C. discharging said pulp from said second section.

24. A method as defined in claim 23, wherein said first and second extraction media each comprise water.

25. A method as defined in claim 23, wherein said first extraction medium comprises water and said second extraction medium comprises an alcohol solution.

* * * * *

UNITED STATES PATENT AND TRADEMARK OFFICE
CERTIFICATE OF CORRECTION

PATENT NO. : 5,409,541
DATED : April 25, 1995
INVENTOR(S) : Walker

It is certified that error appears in the above-indentified patent and that said Letters Patent is hereby corrected as shown below:

Col. 14, line 18, delete "whereto" and substitute -- wherein --.
Col. 14, line 63, delete "routably" and substitute -- rotatably --.

Col. 15, line 27, delete "Wherein" and substitute -- wherein --.
line 33, delete "extraction" and substitute -- extractor --.
line 39, delete "rotorable" and substitute -- rotatable --.
line 47, delete "conveving" and substitute -- conveying --.
line 51, delete ";" and substitute -- , --.
line 52, delete ":" and substitute -- ; --.

Signed and Sealed this

Twenty-seventh Day of June, 1995

Attest:

BRUCE LEHMAN

Attesting Officer     Commissioner of Patents and Trademarks